United States Patent [19]

Matsuda et al.

[11] 4,086,275

[45] Apr. 25, 1978

[54] REDUCED COPPER CATALYST ON SUPPORT

[75] Inventors: Ken Matsuda; William Austin Barber, both of Stamford, Conn.

[73] Assignee: American Cyanamid Company, Stamford, Conn.

[21] Appl. No.: 752,384

[22] Filed: Dec. 20, 1976

Related U.S. Application Data

[62] Division of Ser. No. 636,289, Nov. 28, 1975, Pat. No. 4,040,980.

[51] Int. Cl.$^2$ ................. C07C 103/08; B01J 21/04
[52] U.S. Cl. .................... 260/561 N; 252/463; 252/476
[58] Field of Search .................... 260/561 N; 252/476

[56] References Cited

U.S. PATENT DOCUMENTS

| | | | |
|---|---|---|---|
| 3,869,511 | 3/1975 | Johnson et al. | 260/561 N |
| 3,929,881 | 12/1975 | Kurata et al. | 260/561 N |
| 3,939,205 | 2/1976 | Kurata et al. | 260/561 N |
| 3,944,609 | 3/1976 | Fetchin et al. | 260/561 N |
| 3,966,810 | 6/1976 | Kurata et al. | 260/561 N |

*Primary Examiner*—Arthur P. Demers
*Attorney, Agent, or Firm*—Gordon L. Hart

[57] ABSTRACT

For making supported copper catalyst, useful in hydration of nitriles to produce amides, a cuprous compound e.g. cuprous chloride is impregnated into a support material, e.g. alumina, using acrylonitrile or acetonitrile as the imbibing solvent which is then removed by evaporation. The cuprous compound in the support is reduced to copper in situ, by contact with a reducing agent e.g. sodium borohydride.

1 Claim, No Drawings

REDUCED COPPER CATALYST ON SUPPORT

This is a division of application Ser. No. 636,289, filed Nov. 28, 1975, now U.S. Pat. No. 4,040,980.

The invention relates to improvements in the manufacture of reduced copper catalyst on inert supports and methods for making and using the same.

The use of elemental copper in any of several forms as catalyst for the hydration of nitriles to produce amides has been described. Some of the most effective forms of catalyst for this use comprise copper that has been freshly prepared by reduction of a copper compound with a reducing agent just before or during use. Greene and Godfrey in U.S. Pat. No. 3,381,034 described a catalyst system in which a mixture of elemental copper with cuprous or cupric ions was found to be catalytic for the hydration of nitriles. Watanabe described, at 37 Bull. Chem. Soc. Japan 1325 (1964), the use of Urushibara copper for nitrile hydration. Urushibara copper is elemental copper that has been prepared by the reduction of cupric salts with zinc dust. There have subsequently been described a number of catalysts which comprise freshly reduced copper in several forms, useful as hydration catalysts for the conversion of nitriles to amides.

One of the most effective reducing agents for use in the preparation of reduced copper catalysts is sodium borohydride. Catalysts are prepared by reduction with a solution of this reducing agent in aqueous medium which is the solvent for the borohydride reducing agent.

In efforts to produce supported copper catalysts by impregnating a catalyst support with a solution of copper compound, evaporating the solvent and then reducing the copper compound in situ on the supports, it was found that a borohydride aqueous reducing solution would leach all, or at least a substantial proportion, of the deposited copper compound from the support if the selected copper compound were water soluble. Accordingly, when an aqueous solution of reducing agent is used, the copper compound impregnated in the support must be essentially water-insoluble. Cuprous compounds, are generally not readily soluble in water. Obviously, since simple aqueous solutions of water-insoluble copper compounds could not be made, the impregnation would have to be done using a solution of the water-insoluble copper compound in a suitable liquid solvent which will dissolve the selected copper compound and which will permeate a selected support with the solution. The solvent must be one that will not dissolve or disintegrate the support and which can be selectively removed at a non-destructive temperature leaving the support impregnated with copper compound residue but without solvent residue. Since cuprous chloride is practically insoluble in water and is readily reducible by a borohydride aqueous solution, it is our most preferred copper compound for this purpose. Being a cuprous compound, it has the specific advantage over curpric compounds, that only about half the amount of reducing agent would be required to reduce the cuprous copper to catalytic elemental copper. A catalyst prepared by reduction of any cuprous compound has the latter advantage whether the reducing agent is borohydride or another effective reducing agent, such as hydrogen, carbon monoxide or the like.

According to the invention, a catalyst support material is impregnated with a solution of a cuprous compound in acetonitrile as solvent or in acrylonitrile as solvent and the solvent is evaporated leaving a residue of cuprous chloride dispersed throughout the support. Several successive impregnations of this kind can be made as needed to deposit the desired amount of the selected cuprous compound on the support. The catalyst precursor is preferably kept in its unreduced form until just before the catalyst is to be used. The precursor is then reduced with a suitable reducing agent. It is especially suitable for reduction with borohydride aqueous solution. The reduced catalyst is kept away from oxidizing agents (e.g. air) after the reduction to avoid loss of activity caused by the action of oxidizing agents at surface sites on the catalytic reduced copper.

The process of the invention can be carried out using any of several porous, permeable catalyst support materials. We prefer alumina supports in any of the several forms available such as grains, extrudates, beads, and the like. Porous carbon supports and other porous catalyst support materials can be used, but some may be found not to be as suitable as others for any specific use. The selected catalyst support material must be one that is water-insoluble because the catalyst will have to be used in direct contact with aqueous solutions of the nitrile reactant during the hydration reaction.

The invention permits the selection of a particular support which has particular physical properties that are most advantageous for an intended use. For example, in the hydration of acrylonitrile with water in a fixed bed catalytic reaction it is preferred to select a porous alumina extrudate catalyst support having excellent wet crush strength to provide for maximum catalyst life in the fixed bed reactor in which the catalyst will be constantly immersed in aqueous solution of the nitrile reactant.

Examples of suitable catalyst support materials are gamma-alumina, alpha-alumina, zirconia, pumice, carborundum, titanium dioxide, silica, and some porous carbons. We prefer alumina and especially gamma-alumina notwithstanding that it may be attacked to some extent by strong base when the latter is present in a borohydride reducing solution. Usually this effect is not significant and it can be controlled when necessary by reducing the concentration of strong base in the borohydride solution. It is not a problem when other reducing agents are used.

Supported catalysts can be prepared having any level of copper loading that is desired, up to the maximum capacity of the support. To obtain a low level of copper loading, a solution of the cuprous compound at a concentration less than the saturation concentration in the imbibing solvent may be preferred. As the copper loading on the support is increased the catalytic activity per unit weight of copper in the catalyst may be found to have decreased. Several useful supported catalysts have been made having various copper loadings in the range from about 5 to about 24 percent by weight copper on supports. When an optimum loading of reduced copper has once been determined that will obtain optimum activity for a particular use, then a catalyst with the precise copper loading for optimum activity can be readily prepared by the process of the invention.

The invention can be carried out using conventional pore-impregnation techniques for imbibing the liquid solution of cuprous compound into the porous support and then removing the solvent. Acetonitrile or acrylonitrile, whichever is selected as the solvent for the cuprous compound can be easily removed from the support by evaporation of the solvent at non-destructive temperature. For evaporation of acetonitrile we prefer to use an evaporation temperature about 120° to 140° C. For evaporation of acrylonitrile the preferred evaporation temperature is about 120° C. If the desired degree of copper loading is not achieved by a single impregnation, then several successive impregnations and evaporations can be carried out until the desired amount of cupric compound has been deposited at sites throughout the porous structure of the support.

For reduction of the cuprous compound after it has been impregnated in the support, we prefer to employ sodium borohydride in aqueous solution. The reduction is more efficient, if the solution is made basic by addition of a strong base such as sodium hydroxide. We prefer to use a borohydride solution containing about 0.1 to about 1.0 normal sodium hydroxide. The use of strong base in the solution is found to significantly reduce the amount of borohydride that is consumed for reducing a given amount of the cuprous ion. The concentration of sodium borohydride in the reducing solution as the reduction begins may be in the range from about 0.1 to about 2 percent by wt. and we prefer to use about 0.5 percent. The reduction is carried out by immersing the impregnated catalyst support in the aqueous borohydride solution, being sure to provide enough borohydride in the solution to complete the reduction of all of the copper compound in the support. The reduction is rapid at first but sufficient time should be allowed for complete reduction of the copper throughout the support, which may require about one-half hour, more or less, at 25° to 35° C. The reduced catalyst is removed from the reducing solution in an inert atmosphere, washed with deaerated, deionized, water to remove residual reducing agent and other impurities and then the catalyst is ready for use in the hydration reaction.

The supported copper catalyst is particularly suited for use in fixed bed reactors for continuous use over long periods of continuous operation. In such a use, a liquid aqueous solution of the nitrile reactant is fed slowly through the catalyst bed in one or several fixed bed catalytic reactors at a suitable reaction temperature and the nitrile is continuously hydrated while in contact with the catalyst to make the corresponding amide.

The invention is described in more detail by reference to the following specific examples which include the most preferred mode of carrying out the invention. The invention however can also be embodied in other examples which may vary in several particulars from the detail described in these examples.

EXAMPLE 1

A solution containing 27 gm of cuprous chloride in acetonitrile to make one liter is prepared and then is divided into 250 ml aliquot portions. A batch of 300 gm of 1/32 inch dia. alumina extrudate catalyst support is impregnated by conventional pore volume impregnation technique using 25 ml of the cuprous chloride solution for each of three successive impregnations. Following each impregnation, solvent is evaporated at 120°–140° C. from the support before the next impregnation. After the last impregnation the support contains cuprous chloride at a loading level of 4 gm copper per 100 gm supported material. The impregnated support is immersed in one liter of aqueous solution that has been prepared by dissolving 20 gm $NaBH_4$ in one liter of 0.1N NaOH. One-half hour is allowed for complete reduction of the copper and the catalyst is then thoroughly washed with deaerated, deionized, water and is protected from air. A 2.3 gm sample (dry wt.) taken from the prepared catalyst is mixed with 12.4 gm of a 4.8 percent by wt. acrylonitrile aqueous solution. The mixture of reactants and catalyst is slowly agitated for 30 minutes at 57° C. and then analysis of the solution shows that 14.8 percent of the acrylonitrile has been converted to acrylamide.

EXAMPLE 2

Another sample of 1/32 inch alumina extrudate was porevolume impregnated with a solution of cuprous chloride in acrylonitrile. In this solvent, cuprous chloride has a solubility much greater than it has in the acetonitrile solvent used for Example 1. In acrylonitrile the solubility is about 15.5 gm CuCl/100 gm solution and in two impregnations a catalyst sample was obtained containing about 12 gm copper/100 gm $Al_2O_3$. An 87 gm quantity of this impregnated, unreduced catalyst was immersed in a solution of 2.9 gm $NaBH_4$ in 580 cc of 1N. NaOH. Reaction was complete in 30 minutes. The reduced catalyst sample was washed with water and a 2.8 gm sample was tested using 10.6 gm of 5.4 percent acrylonitrile aqueous solution. In 1 hour of reaction at 57° C., 40 percent of the acrylonitrile was converted to acrylamide. A small amount of $\beta$-hydroxy-propionitrile was also detected in the product.

EXAMPLE 3

Same as Example 2 except that the alumina extrudate was ground and sieved to 60–80 mesh to produce a granular support which was then impregnated and reduced as in Example 2. A 2.8 gm sample of this catalyst was tested as before using 10.8 gm of 5.3 percent acrylonitrile aqueous solution. In 1 hour at 57° C., 39 percent of the acrylonitrile was converted to acrylamide. No by-product formation was detected.

EXAMPLE 4

An 84 gm sample of the unreduced, impregnated catalyst precursor prepared in Example 3, was reduced and washed as in Example 3 and then placed in a packed-bed continuous catalytic reactor, making a total of 8 gm reduced copper on the support in the reactor bed. An aqueous solution of 7.0 percent by weight acrylonitrile was passed continuously through the reactor for a period of over 600 hours. A representative summary of the operating data collected at intervals during this run, namely the reactor temperature, feed rate and conversion, as measured at designated times, is shown in Table I. Percent conversions of acrylonitrile to acrylamide were obtained by analysis of samples removed at the times shown. Time was measured from the beginning of the continuous run.

TABLE I

| Hours Continuous Running From Start When Sample Taken | Temp. 0° | Weight Percent Acrylonitrile In Feed | Feed Rate Grams Solution Per Hour | Percent Conversion to Acrylamide |
| --- | --- | --- | --- | --- |
| 20 | 65 | 7.0 | 39 | 84 |
| 188 | 65 | 7.0 | 27.5 | 88 |
| 355 | 65 | 7.0 | 27 | 90 |
| 475 | 65 | 7.0 | 28 | 87 |
| 620 | 65 | 7.0 | 26 | 85 |
| 650 | 100 | 7.0 | 187 | 90 |

In the foregoing examples the activity of supported copper catalysts prepared by the process of the invention is demonstrated for the hydration of acrylonitrile to make acrylamide. Similarly, these and other supported catalysts prepared by the process of the invention will have catalytic activity in the catalytic hydration of other nitriles to make corresponding amides, in batch or continuous catalytic hydration processes that are adapted for the particular properties of the selected nitrile reactant and its hydration product. Thus, the catalysts described will be useful for hydration of other aliphatic nitriles such as acetonitrile, methacrylonitrile, succinonitrile, etc., aromatic nitriles such as benzonitrile and the like, other cyclic nitriles such as cyclobutane-1,2-dicyanide and the like and still other nitriles such as those that have been described in the prior art references cited earlier in this specification.

The conditions for the catalytic hydration reaction can be varied in several respects so long as the aqueous nitrile solution is contacted in liquid state at reaction temperature with the supported catalyst in solid state, to produce the corresponding amide. It is preferred, but not necessary, that all of the nitrile and water reactants be contacted with the catalyst in a single solution phase, but this is not necessary so long as there is a liquid solution phase present. Thus, for example, in a less preferred case, an excess of acrylonitrile over the saturation amount could be present in the reactor as an immiscible liquid phase present with the liquid solution of water and nitrile. Reaction temperatures below the boiling point of the reaction mixture are preferred. The reaction in most instances can be carried out efficiently with pressure in the reactor at or near atmospheric pressure but the pressure is not critical as long as vaporization does not occur and another pressure may be maintained in the rector if desired. For the catalytic hydration of acrylonitrile using a catalyst of this invention we prefer to operate the catalytic hydration at reaction temperature in the range from about 55° to about 90° C. and at or about 3 to 5 atmospheres pressure.

In the foregoing examples the cuprous compound was cuprous chloride. The invention can be carried out the same using another cuprous compound that is soluble in acetonitrile or acrylonitrile and that is reducible in situ by means of a reducing agent. Examples of other cuprous compounds that can be used instead of cuprous chloride for carrying out the invention include $Cu_2Br_2$, $Cu_2I_2$, $Cu_2(CN)_2$ and the like.

The catalysts prepared by the method of the invention are quite suitable for reduction with aqueous borohydride reducing solution but other reducing agents can be used instead for the reducing step. The cuprous compounds deposited by pore volume impregnation on the support can be reduced by means of a gaseous reducing agent such as hydrogen or carbon monoxide at reducing temperature. For example, the method described in Example 2 of U.S. Pat. No. 3,631,104, which was used there for the reduction of copper chromium oxide with hydrogen, could also be used as well for reduction of the supported cuprous compounds to make the supported copper catalysts of the present invention.

We claim:

1. A method of making acrylamide comprising the catalytic hydration of acrylonitrile in aqueous solution by contacting said solution under hydration reaction conditions with copper catalyst supported on a water insoluble, porous catalyst support prepared by:
    (a) impregnating said catalyst support with a solution of cuprous compound dissolved in a solvent selected from acetonitrile and acrylonitrile, and
    (b) evaporating the solvent from the support, leaving cuprous compound deposited on the support, and
    (c) reducing the cuprous compound on the support to copper in situ by contacting the impregnated support with a reducing agent.

* * * * *